United States Patent [19]

Doss

[11] 4,142,588
[45] Mar. 6, 1979

[54] LISTER STABILIZER

[75] Inventor: Roger A. Doss, O'Donnell, Tex.

[73] Assignee: P&D Products, Inc., O'Donnell, Tex.

[21] Appl. No.: 853,256

[22] Filed: Nov. 21, 1977

[51] Int. Cl.² ............................................. A01B 5/00
[52] U.S. Cl. .................................. 172/190; 172/725; 172/752
[58] Field of Search ............... 172/714, 715, 174, 166, 172/190, 721, 725, 728, 729, 727, 738, 752

[56] References Cited

U.S. PATENT DOCUMENTS

| 297,815 | 4/1884 | Laughlin | 172/166 |
|---|---|---|---|
| 458,121 | 8/1891 | Thaden | 172/166 |
| 459,667 | 9/1891 | Wilson | 172/166 |
| 1,162,842 | 12/1915 | Yost | 172/166 |
| 1,313,611 | 8/1919 | Stirling | 172/715 X |
| 1,585,510 | 5/1926 | Ray | 172/190 X |
| 2,043,619 | 6/1936 | Henley | 172/738 |
| 2,414,175 | 1/1947 | Silver | 172/166 |

FOREIGN PATENT DOCUMENTS 581588  9/1958  Italy ......................................... 172/166

Primary Examiner—Richard J. Johnson
Attorney, Agent, or Firm—Wendell Coffee

[57] ABSTRACT

Plowshares and double moldboards which form listers are attached to shanks connected to a toolbar or frame drafted behind a towing vehicle. Rotatable stabilizing discs, or colters, are rigidly affixed to the shanks behind the moldboards and plowshares. The discs engage solid soil behind the moldboards, thereby impeding lateral movements of the plowshares and moldboards and stabilizing the listers.

2 Claims, 4 Drawing Figures

LISTER STABILIZER

BACKGROUND OF THE INVENTION (1) Field of the Invention.

This invention relates to agricultural implements and, more particularly, to double moldboard plows, or listers.

(2) Description of the Prior Art.

In modern agricultural operations, double moldboard plows, commonly known as listers, are employed to till by listing or bedding the soil for a variety of farm purposes. Such plows ordinarily include a toolbar connected to a tractor, and plowshares and double moldboards connected to shanks depended from the toolbar. The plowshares and moldboards engage the earth. However, as the listers move through the soil, they tend to move laterally or from side to side instead of plowing in a straight line, as desired.

Workers in the art have employed colters connected to separate shanks depending from the toolbar or frame in front of the listers. The colters cut the soil in front of the listers to assist the listers in breaking the earth. Other workers have suspended dished colters by separate shanks from a toolbar or frame behind planters and the like in order to cover up seed placed in furrows.

I was aware of the following references (U.S. Patents) before filing this application:

Thaden: No. 458,121
Wilson: No. 459,667
Gordon et al: No. 884,814
Vanderwater: No. 1,077,443
Yost: No. 1,162,842
Bushmeyer: No. 3,115,192

SUMMARY OF THE INVENTION:

(1) New and Different Function.

I have invented a lister stabilizer which causes a lister to plow in a straight line instead of from side to side. I have accomplished this desirable result by positioning a stabilizing disc or circular plate or colter immediately behind, and rigidly attached to, a lister. The stabilizing disc engages the ground behind the lister and impedes lateral movements of the plowshare and double moldboard.

Another benefit of this device results from the placement of the stabilizing disc immediately behind the lister. When, as in the prior art, a colter is placed in front of the lister, it must traverse trash and loose soil on top of solid soil in order to secure a firm grip in the solid soil. However, in my invention, the colter need not go through the loose soil because the moldboard and plowshare remove the loose soil from around the colter. Therefore, a smaller diameter colter or stabilizing disc may be employed.

Colters previously employed in the art ordinarily had a single member depending from the frame to position the colter in front of the lister or behind the planter. However, when employed with my invention, the side thrust on the disc or colter while it is impeding lateral movements necessitates employing two members rigidly connected to the shank or frame rather than one.

My invention is also adaptable to various types of soil or desired listing applications. I have provided alternate holes in the stabilizer brackets. The bolts for connecting the brackets to the shank or the axle for connecting the disc to the brackets may be positioned through the alternate holes to raise or lower the disc with respect to the lister. This makes my invention extremely versatile.

Thus, I have invented a novel and simple means for stabilizing a lister and facilitating plowing in a straight line by impeding lateral movements. Therefore, the total functioning of my invention is greater than the sum of the individual functions of the plowshares, listers, shank, etc.

(2) Objects of the Invention.

An object of this invention is to bed or list or till soil.

Another object of this invention is to cause a lister to plow in a straight line.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not scale drawings.

Figure 1:
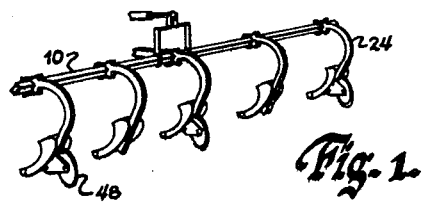
FIG. 1 is a perspective view of an embodiment of my invention attached to a lister plow with draft means attached thereto.
Figure 3:
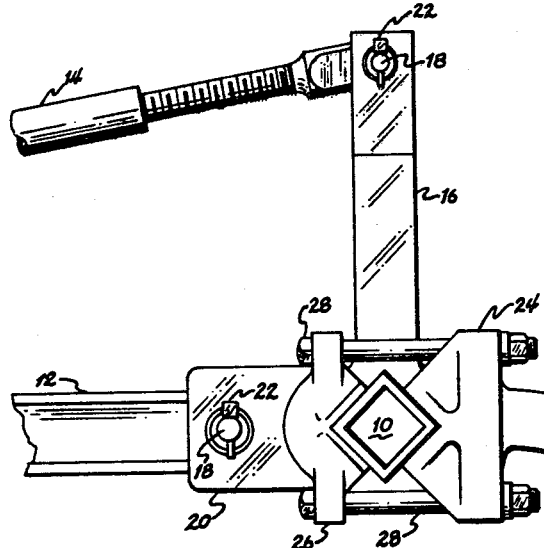
FIG. 3 is a top sectional view of the lister and stabilizer with parts broken away for clarity.
Figure 3:
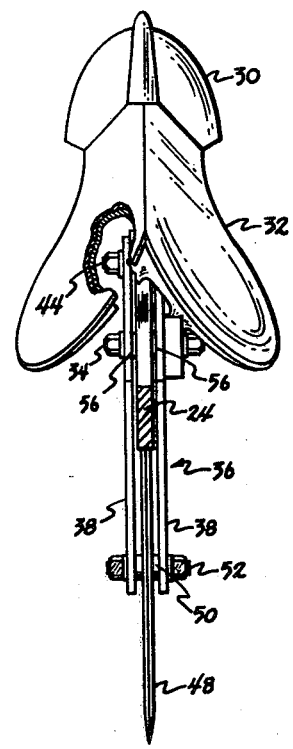
Figure 4:
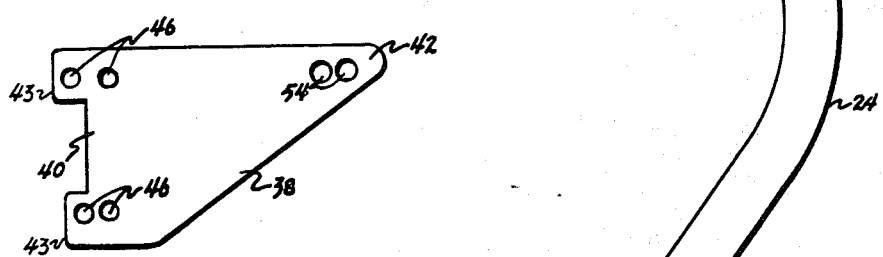
FIG. 4 is a side elevational view of a stabilizing bracket of my invention.

DESCRIPTION OF THE PREFERRED EMBODIMENT:

A double moldboard plow, commonly known as a lister, is drafted behind a tractor or towing vehicle (not shown). As is common in the art, a horizontal laterally extending frame in the form of toolbar 10 is connected to the tractor by 3-point draft means, which includes draft hitch bars 12 and adjustable bar 14. The adjustable bar 14 is connected to center hitch riser 16 by hitch bolt 18. The draft hitch bars 12 are connected to the toolbar 10 at hitch brackets 20 by other hitch bolts 18.

A plurality of shanks 24 depend from the toolbar 10 to position the lister at a convenient depth for plowing. The shanks 24 are connected at their tops to the toolbar by clamps 26 secured around the toolbar 10 and to the top of the shanks 24 by clamp bolts 28. Plowshares 30 and double moldboards 32, which form listers, are rigidly attached to the bottom of the shanks 24 by plow bolts 34.

Stabilizing brackets 36 are formed by two triangular plates 38 extending behind each lister. Each triangular plate has a shank side 40 which is a side of the triangle and axle end 42 which is approximately the angle of the triangle opposite the shank side 40. Tabs 43 are connected to the shank side 40 of each plate 35 at the top and bottom thereof. One of the tabs 43 extends further from the shank side 40 than does the other one. Shank holes 46 are located in the plates proximate the shank sides 40 and in the tabs 43. I prefer to locate the shank hole 46 in the shorter tab 43. This provides a vernier effect when positioning the plates on the shank.

The triangular plates 38 are connected to the shanks 24 along the shank sides 40 by a bracket bolt 44 and the plow bolt 34 positioned through two of the shank holes 46 in the triangular plates 38 and correlated holes (not shown) in each of the shanks 24. Although more holes in the plates and shanks and additional bolts could be employed if desired, I find two bolts to be adequate.

Stabilizing discs or circular plates or colters 48 are located between the triangular plates 38 proximate the axle ends 42. Hubs 50 with bearings (not shown) therein are attached to the stabilizing discs 48. Axles 52 extend through the hubs 50 and through disc holes 54 in the axle ends 42. I prefer to employ two disc holes 54 in each plate 38 to permit vertical adjustment of the discs 48. The discs 48 may therefore rotate between each pair of plates 38 about the axles 52 and the bearings within the hubs 50.

Figure 2:
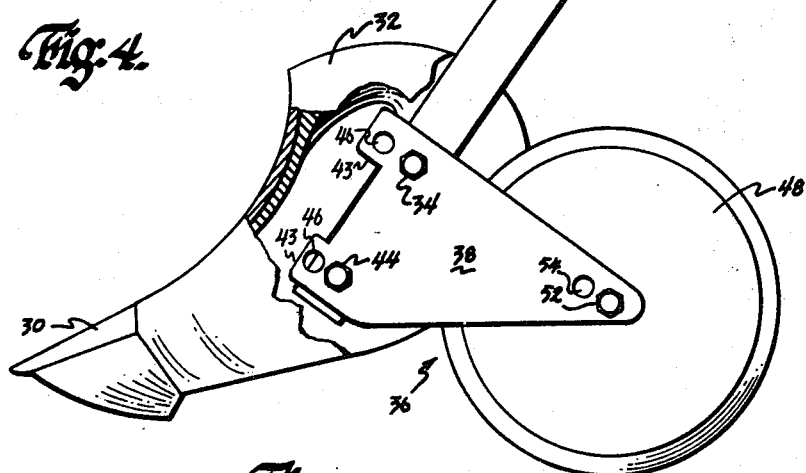
FIG. 2 is a side elevational view of thereof with parts of the lister broken away for clarity.

By employing alternate shank and axle holes 46 and 54 when connecting the stabilizing bracket to the lister and the disc to the bracket, the depth to which the disc penetrates the solid soil may be varied. If an even greater depth of penetration is desired, the two plates 38 may be inverted such that the top of the plates as seen in FIG. 2 would be on the bottom. Therefore, the multiple holes permit easy adjustment of the penetration depth of the stabilizing disc to a relative fine degree.

I prefer to employ two triangular plates 38 for each stabilizing bracket 36 because the shanks or connecting plates employed previously in the art are not of sufficient rigidity and strength to resist the side thrust placed upon the disc or colter as it impedes or resists the lateral movements of the lister. Although a single larger plate or connecting member could be employed, I prefer to employ the two plates 38 as described because they are much less expensive to manufacture and repair.

I also prefer to employ shank spacers 56 welded to the triangular plates 36 at the shank holes 46 for this particular embodiment. I have found it best to have the plates 38 of each bracket 36 approximately parallel to one another. The shank spacers 56 are necessary because for this embodiment, the width of each shank 24 is not as great as the width of each hub 50. Likewise, if the width of each shank 24 is greater than the width of each hub 50, hub spacers (not shown) could be employed. Therefore, the use of the spacers 56 permits easy adaptation of my invention to various types and sizes of plows and hubs.

When the above elements are assembled as described, the following functioning occurs. As the lister is drafted behind the towing vehicle or tractor, the toolbar 10 will be lowered behind the towing vehicle, thereby engaging the plowshares 32 and moldboards 34 with the soil. The stabilizing discs 48 will engage the solid soil behind the plowshares and moldboards. The thinness of the discs 48 allows them to penetrate the soil, and the large side surface area provided by that portion of the discs engaging the soil will impede, restrain, suppress, hinder, or otherwise prevent lateral movements of the lister. I prefer to sharpen the edges of the stabilizing discs 48 somewhat, much as with common colters, in order to facilitate engagement of the soil by the stabilizing discs.

As shown in FIG. 1, a stabilizing disc need not be mounted behind each lister or shank. The stabilization of the middle and end listers and shanks will ordinarily impede lateral movements of the other listers satisfactorily.

As previously discussed, I am able to employ smaller diameter discs 48 than would be necessary if the discs were positioned in front of the listers. This is because the disc 48 are behind the plowshares and moldboards. The discs 48 are directly in contact with solid soil because the moldboards will remove the loose soil and trash from around the discs. The discs in my invention need not traverse the loose soil and trash, and therefore may be smaller in order to engage a sufficient or desirable depth of solid soil.

The smaller diameter discs I employ also result in a placement of the hubs 50 closer to the shanks 24, thereby permitting the use of shorter plates 38. This results in stronger, more rigid stabilizing brackets 36.

Thus I have greatly increased the utility of listers by inventing a novel, versatile, and simple means for stabilizing the lister to cause it to plow in a straight line by restraining lateral movements.

As an aid to correlating the terms of the claims to the exemplary drawing, the following catalogue of elements is provided:
10 toolbar
12 draft hitch bars
14 adjustable bar
16 hitch riser
18 hitch bolts
20 hitch brackets
22 retaining pins
24 shanks
26 clamps
28 clamp bolts
30 plowshares
32 double moldboards
34 plow bolts
36 stabilizing brackets
38 triangular plates
40 shank sides
42 axle ends
43 tabs
44 bracket bolts
46 shank holes
48 stabilizing discs
50 hubs
52 axles
54 disc holes
56 shank spacers The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. On a lister for bedding soil having
   a. a horizontal, laterally extending frame,
   b. draft means connected to the frame for drafting the frame in a direction of draft,
   c. a plurality of plowshares,
   d. a double moldboard connected to each of the plowshares,
   e. a shank connected to each of the plowshares and moldboards, and
   f. said shanks depending from said frame, the improved structure comprising in combination with the above:
- g. two triangular plates,
- h. said triangular plates forming a stabilizing bracket,
- j. one side of the triangle formed by each of said triangular plates being a shank side,
- k. the shank side of each of said triangular plates being connected to one of the shanks and extending behind the shank,
- m. an angle of the triangle formed by each of said triangular plates opposite the shank side being an axle end,
- n. two tabs extending from said shank side of each of said triangular plates,
- o. each of said tabs having at least one shank hole therein,
- p. said triangular plates having at least one shank hole therein proximate at least one of said tabs,
- q. said plates having at least two axle holes therein proximate said axle end, and
- r. a stabilizing disc,
- s. said stabilizing disc being a flat circular plate,
- t. said stabilizing disc being located between the two triangular plates at the axle end.

2. The invention as defined in claim 1 further comprising:
- u. said stabilizing disc having a hub at its center,
- v. an axle journalling said disc to the triangular plates at the axle end thereof,
- w. said axle extending through bearings in said hub, and
- x. shank spacers located between the shank and the triangular plates for spacing the shank sides of said plates approximately the same distance apart as the axle ends of said plates.

* * * * *